(12) United States Patent
Bauch et al.

(10) Patent No.: US 10,544,237 B2
(45) Date of Patent: Jan. 28, 2020

(54) METHOD OF REGULATING HYDROGEN TO A POLYMERIZATION REACTOR

(71) Applicant: ExxonMobil Chemical Patents Inc., Baytown, TX (US)

(72) Inventors: Christopher G. Bauch, Seabrook, TX (US); Todd S. Edwards, League City, TX (US); Daniel L. Bilbao, Houston, TX (US); Kevin W. Lawson, Houston, TX (US); Blu E. Englehorn, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 73 days.

(21) Appl. No.: 15/749,818

(22) PCT Filed: Jul. 25, 2016

(86) PCT No.: PCT/US2016/043857
§ 371 (c)(1),
(2) Date: Feb. 2, 2018

(87) PCT Pub. No.: WO2017/034722
PCT Pub. Date: Mar. 2, 2017

(65) Prior Publication Data
US 2018/0237555 A1 Aug. 23, 2018

Related U.S. Application Data

(60) Provisional application No. 62/210,174, filed on Aug. 26, 2015.

(51) Int. Cl.
*C08F 8/04* (2006.01)
*C08F 210/16* (2006.01)
(Continued)

(52) U.S. Cl.
CPC .............. *C08F 8/04* (2013.01); *C08F 2/38* (2013.01); *C08F 4/6226* (2013.01); *C08F 4/642* (2013.01);
(Continued)

(58) Field of Classification Search
CPC .. C08F 8/04; C08F 2/38; C08F 4/6226; C08F 4/642; C08F 110/06; C08F 210/02;
(Continued)

(56) References Cited

U.S. PATENT DOCUMENTS 4,851,488 A 7/1989 Burstain
4,980,421 A 12/1990 Teramoto et al.
(Continued)

FOREIGN PATENT DOCUMENTS

| JP | 08151408 A | 6/1996 |
|---|---|---|
| WO | 2013/154907 A | 10/2013 |
| WO | 2017/034722 A | 3/2017 |

*Primary Examiner* — William K Cheung (57) ABSTRACT

Disclosed is a method of reducing and/or regulating the level of hydrogen in a polymerization reactor comprising contacting a first feed comprising a first amount of hydrogen with a hydrogenation catalyst prior to entering a polymerization reactor to form a second feed; then contacting the second feed having a second amount of hydrogen with monomers and a polymerization catalyst in a polymerization reactor to form a polymer. The first and second feeds may reside in a feed line from one reactor to another, a monomer feed line to the reactor, or in a recycle line to and from the same reactor.

28 Claims, 2 Drawing Sheets

(51) Int. Cl.
  *C08F 2/38* (2006.01)
  *C08F 110/06* (2006.01)
  *C08F 210/02* (2006.01)
  *C08F 210/06* (2006.01)
  *C08F 4/622* (2006.01)
  *C08F 4/642* (2006.01)

(52) U.S. Cl.
  CPC .......... *C08F 110/06* (2013.01); *C08F 210/02* (2013.01); *C08F 210/06* (2013.01); *C08F 210/16* (2013.01); *C08F 2500/12* (2013.01); *C08F 2800/10* (2013.01)

(58) Field of Classification Search
  CPC .. C08F 210/06; C08F 210/16; C08F 2500/12; C08F 2800/10; C08L 23/12
  USPC ......................................................... 526/65
  See application file for complete search history.

(56) References Cited

U.S. PATENT DOCUMENTS

| | | |
|---|---|---|
| 6,221,982 B1 * | 4/2001 | Debras .................... C08F 10/02 502/104 |
| 7,897,705 B2 | 3/2011 | Aso et al. |
| 9,045,569 B2 | 6/2015 | Jensen et al. |
| 2010/0036068 A1 | 2/2010 | Aso et al. |
| 2010/0036076 A1 | 2/2010 | Aso et al. |
| 2013/0289277 A1 | 10/2013 | Tsujimura |
| 2013/0296506 A1 | 11/2013 | Lawson et al. |
| 2014/0171603 A1 | 6/2014 | Bhandarkar et al. |

\* cited by examiner

METHOD OF REGULATING HYDROGEN TO A POLYMERIZATION REACTOR

CROSS-REFERENCE TO RELATED APPLICATION

The present application is a National Phase Application claiming priority to PCT Application Serial No. PCT/US2016/043857 filed Jul. 25, 2016, and claims priority to U.S. Ser. No. 62/210,174 filed on Aug. 26, 2015, herein incorporated by reference.

FIELD OF THE INVENTION

The present invention relates to the reduction and/or regulation of hydrogen in a polymerization reactor, and in particular to the use of hydrogenation catalysts to reduce or regulate the level of hydrogen reaching and/or within a polymerization reactor.

BACKGROUND

Reactor-produced impact copolymers ("ICP"), in situ blends of propylene homopolymer and propylene/ethylene copolymer ("EP"), are widely available and used in such applications as automotive components and domestic appliances. In making such ICP's, a staged process is typically used whereby the propylene homopolymer is generated in at least one reactor, then that homopolymer is transferred to another stage or reactor to produce the EP, usually relying upon the same catalyst that is used to make the homopolymer. Typically, hydrogen is used in the homopolymer stage/reactor to control its melt flow rate (or molecular weight). When the propylene homopolymer is transferred to the propylene/ethylene stage/reactor the residual hydrogen will go along with it. That hydrogen then acts as a chain termination agent in the copolymerization reactor that generates propylene/ethylene copolymer, typically increasing its melt flow rate (lowering the molecular weight) of the EP. This may be undesirable because there is often a need to have a low melt flow rate (high molecular weight) copolymer component in the ICP. Thus, what is needed is a method of removing, preferably in a controlled manner, the hydrogen prior to entering, and/or within the copolymer stage/reactor. Mechanical means for removing the hydrogen prior to entering the copolymer stage/reactor are available such as a low pressure separation system, but this can be costly to build and operate. The inventors have overcome these and other problems.

Related publications include U.S. Pat. Nos. 9,045,569; 7,897,705; 4,980,421; 4,851,488; US 2013/0289277A1, and JP 08151408.

SUMMARY OF THE INVENTION

Disclosed is a method of regulating hydrogen in a polymerization reactor comprising providing a first reactor and a second reactor fluidly connected and arranged in series; contacting α-olefin monomers and a polymerization catalyst in the first reactor to form a first polyolefin; contacting a first feed comprising hydrogen, the polymerization catalyst, and the first polyolefin with a hydrogenation catalyst to form a second feed; contacting the second feed with α-olefin monomers and the same or different polymerization catalyst in the second reactor to form a polyolefin impact copolymer; wherein the amount of hydrogen in the first feed is greater than that in the second feed.

Also disclosed is a method of regulating hydrogen in a polymerization reactor comprising (or consisting essentially of) contacting a first feed comprising hydrogen with a hydrogenation catalyst prior to entering a polymerization reactor to form a second feed; contacting the second feed with a polymerization catalyst and α-olefin monomers in the polymerization reactor to form a polyolefin; regulating the level of hydrogen in the second feed by varying the amount of hydrogenation catalyst combined with the first feed.

Also disclosed is a method of reducing hydrogen in a polymerization reaction (or reactor) comprising (or consisting essentially of) contacting a first feed comprising hydrogen with a hydrogenation catalyst prior to entering a polymerization reactor to form a second feed; contacting the second feed with α-olefin monomers and a polymerization catalyst in the polymerization reactor to form a polyolefin; wherein the amount of hydrogen in the first feed is greater than that in the second feed.

Also disclosed is a poly(propylene-co-propylene/ethylene) impact copolymer comprising (or consisting essentially of) a propylene homopolymer and within the range from 8 or 10 wt % to 22 or 26 or 30 wt % of a propylene/ethylene copolymer comprising within a range from 35 or 40 wt % to 55 or 60 wt % ethylene derived monomer units, and having a melt flow rate (ASTM D1238 230° C./2.16 kg) within a range from 0.0050 g/10 min to 100 g/10 min.

DETAILED DESCRIPTION

The inventive process includes the addition of a hydrogenation catalyst, preferably a combination of titanocene dichloride with alkylaluminum, into the polymerization reactor process stream. The hydrogenation catalyst is preferably added after the production of polypropylene homopolymer and before the gas phase reactor. The titanocene in conjunction with the alkylaluminum activator acts as a catalyst for hydrogenation of propylene and ethylene, thus removing hydrogen from the reaction system by converting propylene to propane and ethylene to ethane. This allows for the production of high viscosity EP in the gas phase without the need of a mechanical hydrogen removal system. The alkylaluminum may be added with the titanocene, separately from the titanocene, or the alkylaluminum already within the polymerization reactor may be utilized.

Thus, in any embodiment is a method of regulating and/or reducing hydrogen in a polymerization reactor comprising (or consisting essentially of, or consisting of) providing a first reactor and a second reactor fluidly connected and arranged in series; contacting α-olefin monomers and a polymerization catalyst in the first reactor to form a first polyolefin; contacting a first feed comprising hydrogen, the polymerization catalyst, and the first polyolefin with a hydrogenation catalyst to form a second feed; contacting the second feed with α-olefin monomers and the same or different polymerization catalyst in the second reactor to form a polyolefin impact copolymer; wherein the amount of hydrogen in the first feed is greater than that in the second feed. The "first" and "second" reactors can be any type of reactors, independently, such as a slurry reactor comprising any number of "loops", a gas phase reactor comprising any number of fluidized beds and expansion zones, solution reactor, and combinations thereof.

In any embodiment the regulation of hydrogen going to a polymerization reactor is effected by contacting a hydrogenation catalyst with the hydrogen in a first feed that comprises the hydrogen prior to that feed entering the second reactor. The "contacting" takes place prior to the feed including the hydrogenation reactor and hydrogen entering the second reactor. The feed may be coming from the first reactor that is operated in series with the second reactor (or simply "polymerization" reactor), thus, the line may include polymer coming from that first reactor.

Thus, in any embodiment is a method of regulating hydrogen in a polymerization reactor comprising contacting a first feed comprising hydrogen with a hydrogenation catalyst prior to entering a polymerization reactor to form a second feed, contacting the second feed with a polymerization catalyst and α-olefin monomers in a polymerization reactor to form a polyolefin, wherein the amount of hydrogenation catalyst in the first feed is increased to lower the level of hydrogen in the second feed, and decreased to raise the level of hydrogen in the second feed, thus regulating the level of hydrogen. A "first feed" might be, for example, the polymerizing discharge from a prior stage/reactor. The first feed, in addition to hydrogen, may also include polymer, especially polypropylene, and its entrained catalyst. The "second feed" might be, for example, a feed of polymer with its entrained catalyst transported to a subsequent polymerization stage/reactor. The first and second feeds may reside in a feed line from one reactor to another, a monomer feed line to the reactor, or in a recycle line to and from the same reactor.

By "regulating" what is meant is that the level of hydrogen reaching the polymerization reactor is such that its concentration is increased or decreased in a manner dictated by a person or control device (e.g., computer). The "regulating" is preferably effected by adjusting the amount of hydrogenation catalyst introduced into the feed such that the hydrogen concentration in the subsequent stage/reactor is increased or decreased in a manner dictated by a person or control device (e.g., computer).

Stated another way, in any embodiment is a method of reducing hydrogen in a polymerization reactor comprising contacting a first feed comprising hydrogen with a hydrogenation catalyst prior to entering a polymerization reactor to form a second feed, contacting the second feed with monomers and a polymerization catalyst in a polymerization reactor to form a polymer, wherein the amount of hydrogen in the first feed is greater than the amount of hydrogen in the second feed.

Stated yet another way, in any embodiment is a method of reducing hydrogen in a polymerization reactor comprising contacting the feed comprising hydrogen with a hydrogenation catalyst prior to entering a polymerization reactor, contacting the feed with monomers in a polymerization reactor to form a polymer, wherein the amount of hydrogen is in the polymerization reactor is reduced by the hydrogenation catalyst.

In any embodiment, the first feed is preferably contacted with the hydrogenation catalyst in a feed line connected to the polymerization reactor. The "hydrogenation catalyst" can be any chemical composition that reacts with hydrogen in such a way to either transform it to another substance (e.g., combine with an alkene to form an alkane) or sequester it such that it is no longer capable of chemically reacting with any other substance. Metals, supported or not, such as palladium and/or platinum can be suitable hydrogenation catalysts. Some hydrogenation catalysts require an "activator" such as an alkylaluminum compound or blend of such compounds. Preferably, the hydrogenation catalyst comprises a titanocene catalyst precursor (or referred to herein as a "titanocene") as used in combination with an alkylaluminum. Preferably, the titanocene catalyst precursor is selected from $C_2$ and Cs-symmetric titanocene cations comprising any two ligands selected from cyclopentadienyl ligands and ligands isolobal to cyclopentadienyl, and anions selected from halogen, alkyl, and alkoxy groups. Preferably the titanocene catalyst precursor is $C_2$ symmetric, such as a bis-cyclopentadienyl titanium dihalide or dialkyl, or bis-indenyl titanium dihalide or dialkyl.

The titanocene and alkylaluminum can be combined simultaneously or separately in time and space. Preferably, the titanocene and alkylaluminum are combined such that they react with hydrogen prior to entering the polymerization reactor. Suitable alkylaluminums include those having the general formula $AlR_3$, where R is a C1 to C10 alkyl, most preferably a C1 to C5 alkyl.

In any embodiment within the range from 0.0001 mmole to 0.01 mmole of the titanocene is contacted with the hydrogen. Also in any embodiment a molar ratio of alkylaluminum to titanocene within a range from 1 to 5 is contacted. Stated another way, in any embodiment the rate of titanocene fed to the reactor is within a range from 500 or 600 or 800 or 1,000 mole $H_2$/mole titanium/min to 3,000 or 4,000 or 5,000 mole $H_2$/mole titanium/min, the rate that is contacted with the feed containing hydrogen to be consumed. These amounts of components can be independently increased or decreased to effect the regulation of hydrogen in the feed line, and in particular, hydrogen entering the polymerization reactor. Thus, for example, the amount of titanocene can be increased alone, or can be increased with an increase in the alkylaluminum. This can also be reversed to allow more hydrogen to stay in the feed line and enter the polymerization reactor.

There may be any amount of hydrogen in the feed line, depending upon the nature of the process from which the feed derives. Preferably, the feed is derived from a propylene homopolymerization process where hydrogen is used to regulate the melt flow rate (or molecular weight) of the so formed polypropylene. In any embodiment, the first feed preferably comprises within the range from 50 or 80 or 100 or 140 or 180 mmol $H_2$ to 200 or 240 or 280 or 300 or 350 or 400 mmol $H_2$. Also, in any embodiment the second feed (or subsequent stage/reactor hydrogen concentration) comprises within the range from 0.50 or 1.0 or 2.0 or 5.0 or 10.0 mmol $H_2$ to 20 or 25 or 30 or 35 or 40 mmol $H_2$.

Stated another way, in any embodiment, in for example a commercial scale reactor, the level of hydrogen used in propylene homopolymerization is within a range from 100 or 200 or 500 mppm to 8,000 or 10,000 or 12,000 or 15,000 mppm (mole parts per million, or ppm on a molar basis) relative to the total amount of monomer, which is preferably liquid propylene; and the level of hydrogen used in copolymer production is within a range from 100 or 200 or 400 mppm to 1,000 or 5,000 or 10,000 or 25,000 or 50,000 mppm relative to the total amount of monomer, which is preferably gaseous monomer and hydrogen in the reactor, preferably a gas phase reactor; and after contacting the feed from the propylene polymerization reactors, the concentration of hydrogen going to the copolymerization reactor, preferably a gas phase reactor, is within a range from 0 or 10 or 20 or 50 or 100 mppm to 200 or 300 or 400 or 500 or 1,000 or 4,000 or 8,000 or 10,000 mppm relative to total monomer in the reactor.

In any embodiment, the first feed comprises within the range from 100 mppm to 15,000 mppm (or any range described herein) relative to liquid propylene, and the second feed comprises within the range from 0 mppm to 10,000 mppm (or any range described herein) relative to total monomer in the reactor, wherein the total amount, or flow rate, of hydrogen in the second feed is less than that of the first feed.

The inventive process is suitable for use in any type of polymerization reactor that requires the regulation and/or removal of hydrogen from one stage to another. Preferably, the inventive process is applicable to a polyolefin polymerization process, and most preferably to a process to make a poly(propylene-co-propylene/ethylene) impact copolymer. In this regard, a non-limiting example of such a process is described with reference to FIG. 1, which depicts at least one a slurry reactor (which may comprise any number of loops) and at least one gas phase reactor (which may comprise any number of fluidized beds) fluidly connected and arranged in series, meaning that fluids and gases are allowed to flow from one reactor to another to carry polymer, monomer, catalyst and/or other gases such as hydrogen in such a manner that polymerization can occur in, for example, the slurry reactor then can continue in, for example, the gas phase reactor.

Figure 1:
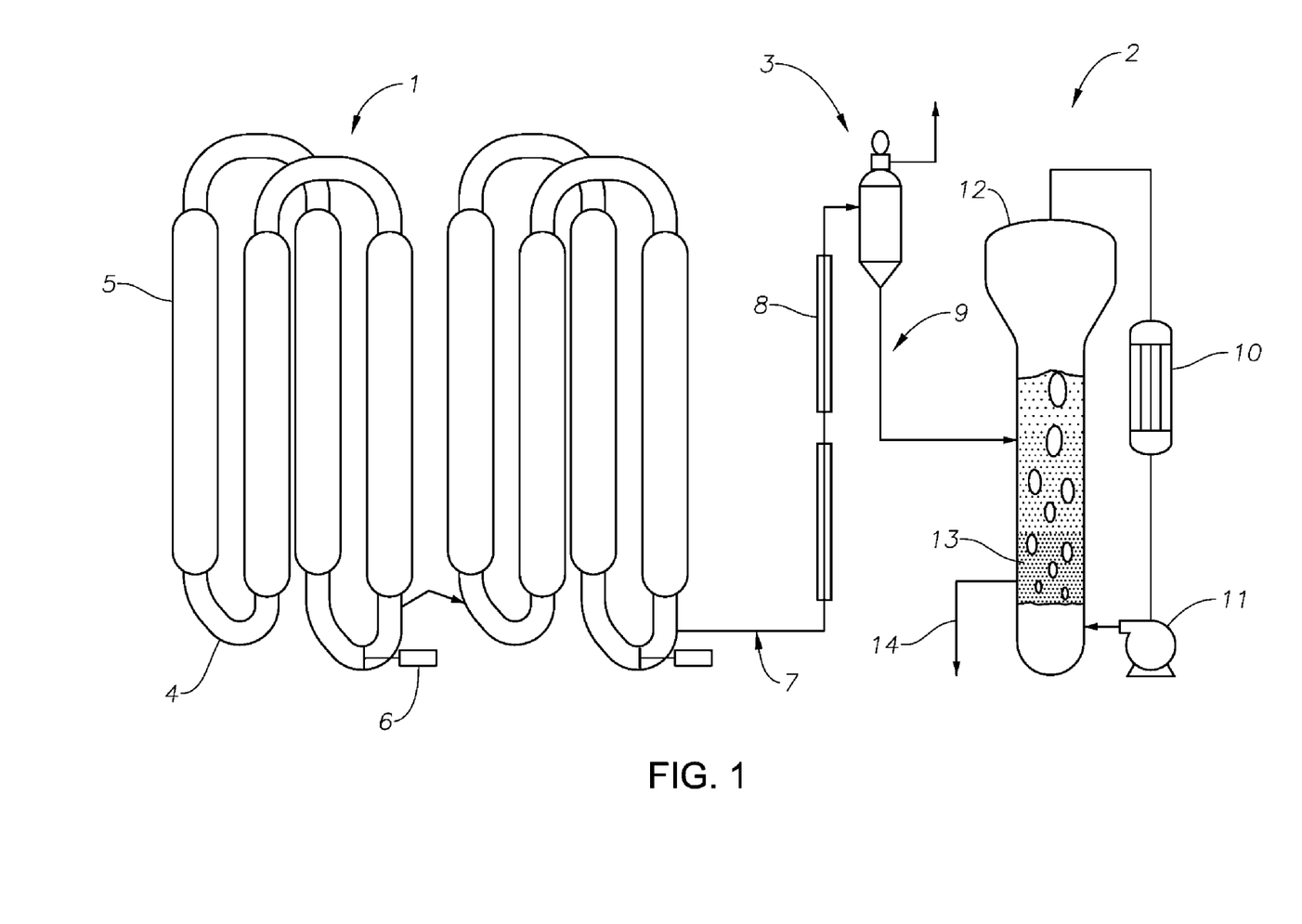
FIG. 1 is a schematic diagram of a two stage reactor system for producing ICP.

In any embodiment, the inventive process may be carried out in at least a two stage process, whereby at least one reactor is used to make a propylene homopolymer and another reactor is used to make the EP. Referring to FIG. 1, propylene homopolymer is produced in reactor 1, which can preferably be a slurry loop reactor, and the EP is produced in another reactor 2, which can preferably be a gas phase reactor, most preferably a fluidized bed gas phase reactor. As suggested in FIG. 1, propylene is contacted with a polyolefin polymerization catalyst in a slurry loop reactor 1. There may be any number of loops 4, each preferably having a heat removal jacket 5, whereby the monomers in either a liquid (pure propylene) or solution (propylene with a diluent) are cycled through the loops using at least one pump 6 along with polymerization catalyst and hydrogen. The propylene homopolymer that is produced from reactor 1 is then feed through the effluent line 7, preferably having heated jackets 8, to a high pressure separator 3, whereby the pressure from the reactor 1 is lowered to recover a large portion of the unreacted monomer and hydrogen and to allow the transfer of the homopolymer and catalyst and a portion of the unreacted monomer and hydrogen to the reactor 2 which may be at a lower pressure. In any case, the propylene homopolymer containing polymerization catalyst and hydrogen is then passed through feed line 9 that leads to the reactor 2. Prior to delivering the feed from reactor 1 to reactor 2, the hydrogenation catalyst is contacted with the feed in either one or both of lines 7 and/or 9, most preferably line 9.

After contacting the hydrogenation catalyst with the hydrogen in either one or both of lines 7 and 9, the second feed passes to reactor 2 via feed line 9. The level of hydrogenation catalyst can be regulated by altering the concentration of the hydrogenation catalyst (and or its co-catalyst such as the alkylaluminum), especially if it is in solution, and/or the rate at which it is added to either or both lines. The amount can be regulated to tailor the level of hydrogen desired, thus allowing for control over the melt flow rate (i.e., molecular weight) of the EP to be formed in reactor 2. Preferably, the propylene homopolymer, along with entrained polymerization catalyst, is added along with ethylene monomers to the fluidized bed zone 13 of the gas phase reactor having an expansion zone 12 where the forming ICP is returned to the fluidized bed zone and monomer is recycled through recycle lines that incorporate a cooler 10 then to compressor 11 then are flowed back through reactor 2. The point along the reactor 2 in which the feed from feed line 9 enters the reactor is not critical, and depending on the type of reactor that is used to make the EP, the feed line 9 may enter anywhere that is suitable.

Preferably, a low pressure separation system is absent from the feed lines 7 and/or 9, and/or polymerization reactor 2. Most preferably, a low pressure separation system is not used to remove hydrogen, or regulate hydrogen, from any step of the polymerization process.

In any embodiment, a polymerization catalyst such as a metallocene or Ziegler-Natta polymerization catalyst is contacted with the propylene homopolymer and ethylene to form a poly(propylene-co-propylene/ethylene) impact copolymer comprising a propylene/ethylene copolymer. Preferably, the polymerization catalyst is imbedded into the propylene homopolymer particles which are porous enough to allow further polymerization with ethylene and/or propylene monomers to form a copolymer within the homopolymer matrix.

In any embodiment, the hydrogenation catalyst, preferably titanocene with or without alkylaluminum, is injected into the gas recirculation system, or recycle line, of the polymerization reactor, preferably the gas phase polymerization reactor.

In any case, regulation of the amount of catalyst can be achieved either via an intermittent flow using volumetric measurement or continuous flow using a pump. This can be upstream or downstream of heat exchange equipment in the process, or upstream or downstream of gas compression or blower equipment in the process stream, or in the solids transfer line into the gas phase reactor from upstream equipment; in any case, upstream of the gas-phase reactor. The turbulence of this high-flow gas system allows for adequate mixing of the hydrogenation catalyst into the gas stream prior to introduction into the gas phase reactor itself, and a brief residence time to initiate the hydrogenation reaction prior to reaching the polymer bed in the reactor itself. This provides for control of a hydrogenation reaction whether the material is introduced as a mixture with its activator (in the case of titanocene) or as a slurry, either utilizing the residual alkylaluminum in the polymerization process to act as the titanocene reducing agent or adding the alkylaluminum in the slurry transfer system.

Desirably, control of the propylene or ethylene hydrogenation reaction using hydrogenation catalysts in a polymerization reactor incorporates any one or more of three aspects: (1) full dispersion of the material into the reaction medium, (2) residence time to provide for completion of the reaction, and (3) flow control of a very small, yet specific quantity of hydrogenation catalyst to achieve the necessary molar ratio of hydrogenation catalyst to hydrogen in the system. The catalyst in one aspect of this invention is delivered as a liquid solution in which hydrogenation catalyst is activated with an alkylaluminum (in the case of titanocene) and then diluted in a hydrocarbon solvent, for example n-hexane.

The first two aspects are achieved in this invention by proper selection of injection location into the polymerization reactor system. In any embodiment the injection location can be either upstream or downstream of the gas compressor or its associated heat exchanger in the recycle system (including the recycle line and any coolers, heaters and pumps) of the polymerization reactor, or directly into the monomer feed streams to the reactor, or in the polymer solids feed into the polymerization reactor. It is further preferred that the injection location be upstream of any reaction inhibitor added, for example oxygen, alcohols, or other oxygenated compounds, as this allows for initiation of the hydrogenation reaction at the point of lowest concentration of the inhibitor which also limits the effectiveness of the hydrogenation catalyst.

Flow control, the third aspect of control, in any embodiment is achieved via multiple, batch injections of a specified volume of hydrogenation catalyst using a sequence of valves and control automation. Preferably, controlling the reaction is accomplished by injecting the solution at a frequency that provides for a linear, predictable hydrogenation reaction by using a ratio based on the residence time of the polymerization bed in the gas phase reactor, which varies, depending on the polymer being produced. The range of variation versus the quantity of hydrogenation catalyst required, is beyond what pumps of this size range could typically control well. The timed volumetric method allows for a broad range of operating regions by providing a system where injection timing (average flow rate) and concentration of catalyst solution can both be modified during reactor operation without mechanical adjustments of a pump, or multiple pumps in the same service.

In any embodiment, a positive-displacement piston style pump selected for its ability to tightly control both stroke and speed at very small increments may be used for flow control. A gear pump may also be used, but further limits the range of flow variation possible.

In any embodiment, the hydrogenation catalyst is delivered to the reactor as an intermittent "shot" of hydrogenation catalyst, in some instances unactivated hydrogenation catalyst such as titanocene alone, in solid form via a rotary solids feeder or other solids metering device. This solid stream is then swept into the targeted location using a hydrocarbon stream, typically a light paraffin or oil, along with the catalyst activator, typically an alkylaluminum (for example triethylaluminum). The liquid stream thus performs the function of activating the hydrogenation catalyst prior to injection into the reaction medium as well as transporting the catalyst to the reaction medium. The hydrogenation may also be injected without the activator, utilizing the alkyl in the gas phase reactor to activate.

In any embodiment, any solid hydrogenation catalyst is slurried by the hydrocarbon stream to the polymerization reactor prior to the catalyst's dissolving into solution. Some catalysts such as titanocene are not soluble in hydrocarbon streams until it is reduced with the alkylaluminum. As such, the initial velocity at the pickup point of the catalyst must be high. The velocity of this stream is dependent upon the specific particle size of the catalyst employed. This is calculable by methods well-known in the art of suspending solid particles in a flowing liquid. The second aspect requires that the system provides enough residence time for the reduction step of the titanocene with alkylaluminum to occur in time to provide sufficient hydrogen reduction for the control requirement at hand. This is provided for by either (a) designing a delivery line of sufficient length to achieve the necessary residence time as the catalyst is carried to the injection point, or (b) utilizing a vessel downstream of the solid pickup point but upstream of the liquid injection point. The vessel is of sufficient volume to provide the required residence time, and utilizes an agitator instead of fluid velocity to provide the turbulence required to maintain a slurry of solid particles until the reduction occurs and the now-activated catalyst dissolves. From this vessel onward to the liquid injection point, the catalyst is now in a stable solution.

As an alternative, a high velocity stream of paraffin, olefin, or oil alone can be used to carry the solid hydrogenation catalyst as a slurry to the reaction injection point and remaining alkylaluminum from the reaction process then acts as the activating agent for the titanocene, starting the hydrogenation reaction upon injection. In a reaction system where sufficient excess alkylaluminum is present and residence time is available to activate the titanocene and drive the hydrogenation reaction to the extent needed, this is a preferred method due to reduced handling and raw material costs associated with the activator (if needed) and any solvents required in an alternate system as discussed previously.

Any type of polymerization catalyst can be used to effect the formation of polyolefin, especially the ICP described above. Useful catalysts include metallocenes and other single site catalyst and their associated activators, and Ziegler-Natta catalyst and its associated activator. In either case, the alkylaluminums described herein may also be used as the activator for the polymerization catalyst. In any embodiment, the alkylaluminum that is used in the polymerization of $\alpha$-olefins to form polyolefins is also the alkylaluminum that activates the titanocene hydrogenation catalyst, thus, in those cases additional alkylaluminum does not need to be added with the titanocene. In any case, polyolefins that can be produced include polyethylene, polypropylene, and copolymers of ethylene and propylene (propylene/ethylene copolymer). Most preferably, the catalyst is useful in forming propylene homopolymers as an in situ blend with propylene/ethylene copolymer to form an ICP. In that case, the catalyst should be capable of readily polymerizing propylene and copolymerizing propylene and ethylene while maintaining high catalyst activity.

Figure 2:
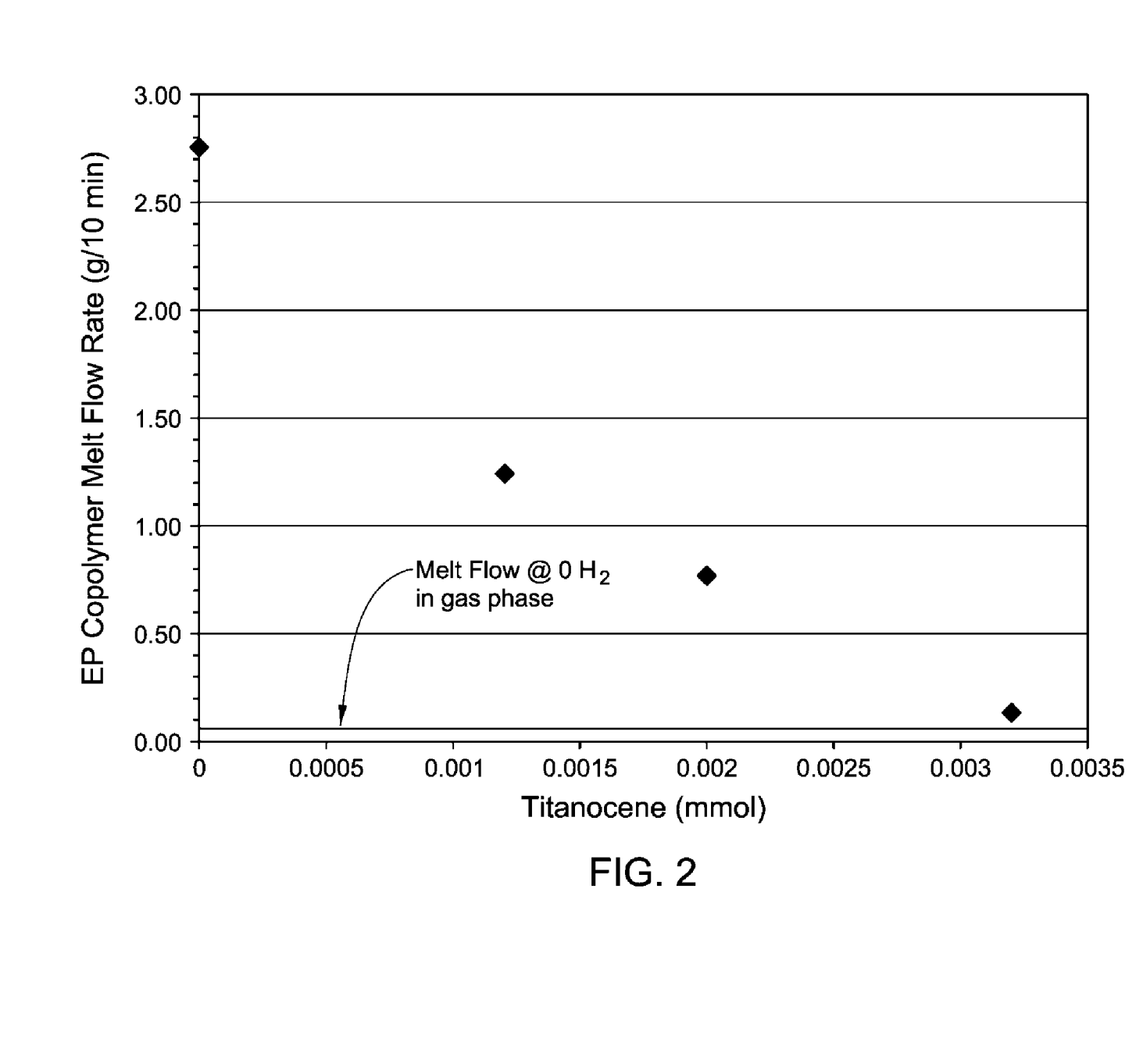
FIG. 2 is a plot of melt flow rate of EP produced as a function of the level of titanocene hydrogenation catalyst added to the feed line.

In any embodiment the melt flow rate (ASTM D1238 230° C./2.16 kg) of the propylene/ethylene copolymer is within a range from 0.0050 or 0.05 or 0.5 or 1 g/10 min to 4 or 5 or 10 or 20 or 50 or 100 g/10 min. This can be effected, that is, made to increase or decrease, by the inventive process. Also in any embodiment, the melt flow rate (ASTM D1238 230° C./2.16 kg) of the poly(propylene-co-propylene/ethylene) impact copolymer is within a range from 20 or 25 g/10 min to 35 or 40 or 45 or 50 or 55 or 60 or 70 or 80 or 100 or 200 or 400 or 500 g/10 min. This can also be effected by the inventive process. Thus, for instance, when the level of hydrogenation catalyst is such that there is no detectable hydrogen in the feed line entering the reactor, the melt flow rate of the EP may be as low as 0.0050 g/10 min, but can be increased with increasing hydrogen reaching the polymerization reactor, such as demonstrated in FIG. 2.

Most preferably, when a poly(propylene-co-propylene/ethylene) impact copolymer is the final product, the propylene/ethylene copolymer comprises within a range from 35 or 40 wt % to 55 or 60 wt % ethylene derived monomer units. Also in any embodiment, the poly(propylene-co-propylene/ethylene) impact copolymer comprises within a range from 8 or 10 wt % to 22 or 26 or 30 wt % of the propylene/ethylene copolymer.

Thus derived from the inventive process, in any embodiment is a poly(propylene-co-propylene/ethylene) impact copolymer comprising (or consisting essentially of) a propylene homopolymer and within the range from 8 or 10 wt % to 22 or 26 or 30 wt % of a propylene/ethylene copolymer comprising within a range from 35 or 40 wt % to 55 or 60 wt % ethylene derived monomer units, and having a melt flow rate (ASTM D1238 230° C./2.16 kg) within a range from 0.0050 g/10 min to 5.0 g/10 min, wherein the melt flow rate of the poly(propylene-co-propylene/ethylene) impact copolymer is within a range from 20 or 25 g/10 min to 35 or 40 or 45 or 50 or 55 or 60 or 70 or 80 or 100 g/10 min; and wherein the melt flow rate of the propylene homopolymer is within a range from 80 or 100 g/10 min to 220 or 260 or 280 or 300 or 400 or 500 g/10 min.

Such impact copolymers are useful in any number of finished articles such as automotive components, appliance components such as refrigerators, and sporting goods and equipment. The impact copolymers may also be foamed as is known in the art to make any number of useful articles.

The various descriptive elements and numerical ranges disclosed herein for the inventive process can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

The effect of hydrogenation catalyst on the level of hydrogen in a polymerization reaction was tested using titanocene dichloride in a one reactor, two-stage process. A first polymerization was first carried out to produce propylene homopolymer followed by a second polymerization to make EP, both using the same Ziegler-Natta type catalyst as set forth in Table 1. A solution of titanocene dichloride and triethylaluminum (TEAL) in hexane (1:4, 0.004 M) was injected into the reactor following the venting of the propylene from the homopolymerization and prior to re-pressurizing with hydrogen and the propylene/ethylene (60/40) gas mixture. A second polymerization, in the presence of the propylene homopolymer produced in the first polymerization, made propylene/ethylene copolymer. The conditions of the polymerizations that were performed are: the homopolymer reaction lasted 60 minutes, at 70° C., using 250 mmol $H_2$, 1.6 mmol TEAL, 0.16 mmol external donor (a silane compound, Al/Si=10); the copolymer reaction lasted 60 minutes, at 70° C., using 25 mmol $H_2$, 180 psig, propylene: ethylene (monomer)=60:40. This produced an ICP.

Table 1 lists ICP polymerizations performed using THC-133 catalyst (from Toho) external donors as in U.S. Pat. No. 6,087,459 (collectively, "C1"), and another titanium/magnesium based Ziegler Natta catalyst with a commercial external donor called "U donor" (from Toho, collectively "C2"). In both sets of polymerizations, 250 mmol $H_2$ was used in the homopolymerization and 25 mmol $H_2$ in the copolymerization. The C2 system is known to give a higher hydrogen response than the C1 catalyst system. The C2 system is thus more sensitive to low concentrations of hydrogen remaining after removal by the titanocene. As the amount of titanocene increased, the EP melt flow decreased as shown in FIG. 1. As the melt flow rate of the EP being generated in the presence of the propylene homopolymer (hPP) cannot be determined directly, the EP melt flow rate ($MFR_{EP}$) was calculated (and the intrinsic viscosity can also be calculated) knowing the overall melt flow rate ($MFR_{ICP}$) and that of the hPP ($MFR_{hPP}$) using the relationship:

$$MFR_{EP} = e^{((LN(MFR_{ICP})-((1-Cv) \cdot LN(MFR_{hPP})))/Cv)}, \text{ and}$$

$$IV_{EP} = 2.6 \cdot (MFR_{EP})^{-0.23}$$

where "IV" is the intrinsic viscosity of the EP, and "Cv" is the fraction of the EP in the ICP (e.g., 20 wt % is 0.20).

At 0.003 mmol of titanocene, the melt flow decreased to the same level as when no hydrogen was added in the gas phase. This indicates that at this ratio of titanocene to hydrogen ($1.28 \times 10^{-4}$ to 1), all of the hydrogen has been consumed before a significant amount of copolymer was produced. Despite the decrease in melt flow for the EP, the activity of the catalyst was not adversely affected by the addition of the metallocene solution. These results indicate that the titanocene catalyst could provide a way to chemically remove hydrogen from the polymerization system, allowing high intrinsic viscosity ratio ICP to be made without the need for a mechanical system.

TABLE 1

Two-stage ICP Polymerizations with varying titanocene

| Catalyst | $Cp_2TiCl_2$ (mmol) | hPP Activity (g/g/hr) | PE Activity (g/g/hr) | Total Activity (g/g) | $MFR_{ICP}$ (dg/min) | EP (wt %) | ethylene (wt %) | MFR $EP^‡$ (dg/min) |
|---|---|---|---|---|---|---|---|---|
| C1 | 0 | 45,308 | 12,051 | 57,359 | 59.9 | 21.0 | 43.8 | 5.0 |
| C1 | 0.0004 | 41,413 | 13,563 | 54,976 | 42.9 | 24.7 | 48.6 | 2.0 |
| C1 | 0.0008 | 36,737 | 11,279 | 48,017 | 34.9 | 23.5 | 62.6 | 0.70 |
| C2* | 0 | 27,659 | 6915 | 34,574 | 105.1 | 10.6 | 57.8 | 0.22 |
| C2 | 0 | 35,199 | 9026 | 44,226 | 98.7 | 20.4 | 47.0 | 2.8 |
| C2 | 0.0012 | 36,632 | 9295 | 45,790 | 84.4 | 20.3 | 43.3 | 1.2 |
| C2 | 0.0020 | 36,365 | 10,500 | 45,456 | 65.1 | 23.1 | 55.4 | 0.8 |
| C2 | 0.0032 | 33,408 | 9475 | 41,760 | 45.1 | 22.7 | 55.5 | 0.1 |

*No hydrogen added in gas phase.
‡Calculated using 116 g/10 min and 247 g/10 min for the C1 and C2 homopolymer melt flow rates (ASTM D1238 230° C./2.16 kg) respectively.

Another set of experiments was conducted in a one reactor process to demonstrate the injection of solid titanocene without associated alkylaluminum but only using the alkylaluminum activator already in the polymerization reactor. Solid titanocene dichloride was suspended in mineral oil to make a 1.0 wt % slurry. This slurry was added to the polymerization reactor followed by hydrogen at room temperature. Then the Ziegler-Natta catalyst (titanium/magnesium based), triethylaluminum (TEAL) and electron donor were then injected into the reactor with liquid propylene. The reactor was heated to 70° C. for one hour. Specifically, the conditions were as follows: 2 L autoclave, 1.25 L propylene, 7.5 mg catalyst, 60 minutes, 70° C., 1.6 mmol TEAL, 0.16 mmol cyclohexylmethyldimethoxysilane (Al/Si=10).

The melt flow of the polymer was reduced from 6 g/10 min without titanocene to less than 0.1 g/10 min with 3 mg titanocene dichloride. This melt flow is comparable to that achieved when no hydrogen is added to the reactor. Activity also decreased to levels comparable to that when no hydrogen was added. The results are summarized in Table 2. Thus, despite not activating the titanocene dichloride with TEAL prior to addition to the reactor, the TEAL present in the reactor was sufficient to generate active hydrogenation catalyst. Solid titanocene dichloride can be added to the process as a slurry in inert carrier such as aliphatic hydrocarbons, mineral oil, or grease. If it is added to a gas phase reactor, the titanocene could also be added as a dry solid. Preferably, the solid would be a fine powder to produce a higher surface area.

TABLE 2

One-stage propylene polymerization with varying titanocene

| $Cp_2TiCl_2$ (mg) | $H_2$ (mmol) | Activity (g/g/hr) | MFR* (dg/min) |
|---|---|---|---|
| 1.0 | 83 | 28,347 | 1.7 |
| 2.1 | 83 | 30,961 | 2.1 |
| 3.0 | 83 | 13,013 | 0.04 |
| 3.0 | 83 | 18,187 | 0.07 |
| 0 | 0 | 14,130 | 0.06 |
| 0 | 100 | 38,887 | 6.0 |

*MFR is "melt flow rate", ASTM D1238 230° C./2.16 kg

Having described the various features of the inventive process, disclosed here in numbered paragraphs is:

P1. A method of regulating hydrogen in a polymerization reactor comprising (or consisting essentially of) contacting a first feed comprising hydrogen with a hydrogenation catalyst prior to entering a polymerization reactor to form a second feed; contacting the second feed with a polymerization catalyst and α-olefin monomers in the polymerization reactor to form a polyolefin; regulating the level of hydrogen in the second feed by varying the amount of hydrogenation catalyst combined with the first feed.

P2. The method of numbered paragraph 1, wherein the first feed is contacted with the hydrogenation catalyst in a feed line connected to the polymerization reactor.

P3. The method of any one of the previous numbered paragraphs, wherein the first feed is contacted with the hydrogenation catalyst in a recycle line connected to the polymerization reactor.

P4. The method of any one of the previous numbered paragraphs, wherein the hydrogenation catalyst comprises a titanocene catalyst precursor.

P5. The method of numbered paragraph 4, wherein the hydrogenation catalyst further comprises an alkylaluminum.

P6. The method of numbered paragraph 4, comprising feeding the titanocene catalyst precursor within the range from 500 to 5,000 mol $H_2$/mole titanium/minute.

P7. The method of numbered paragraph 5, wherein a molar ratio of alkylaluminum to titanocene is from 1 to 5.

P8. The method of numbered paragraph 4, wherein the alkylaluminum is a C1 to C5 alkylaluminum.

P9. The method of any one of the previous numbered paragraphs, wherein the first feed comprises within the range from 100 mppm to 15,000 mppm of hydrogen relative to the total amount of monomer.

P10. The method of any one of the previous numbered paragraphs, wherein the second feed comprises within the range from 0 mppm to 10,000 mppm of hydrogen relative to the total amount of monomer.

P11. The method of any one of the previous numbered paragraphs, wherein the first feed further comprises propylene homopolymer.

P12. The method of claim 11, wherein the α-olefin monomers are ethylene and propylene, and the polymerization catalyst is contacted with the propylene homopolymer and monomers to form a poly(propylene-co-propylene/ethylene) impact copolymer comprising a propylene/ethylene copolymer.

P13. The method of claim 12, wherein the melt flow rate (ASTM D1238 230° C./2.16 kg) of the propylene/ethylene copolymer is within a range from 0.0050 g/10 min to 100 g/10 min P14. The method of claim 12, wherein the propylene/ethylene copolymer comprises within a range from 35 wt % to 60 wt % ethylene derived monomer units.

P15. The method of any one of the previous numbered paragraphs, wherein the hydrogen content in the first feed is greater than the hydrogen content in the second feed.

P16. The method of any one of the previous numbered paragraphs, wherein the polymerization reactor is a gas phase reactor comprising an expansion zone, a fluidized bed zone, and a feed line fluidly connected to the gas phase reactor, wherein contacting the first feed with the hydrogenation catalyst takes place in the feed line.

P17. The method of numbered paragraph 16, wherein a low pressure separation system is absent from the feed line and/or the polymerization reactor.

P18. The method of any one of the previous numbered paragraphs, wherein the first feed comprises within the range from 100 mppm to 15,000 mppm of hydrogen relative to the total amount of monomers, and the second feed comprises within the range from 0 mppm to 10,000 mppm of hydrogen relative to the total amount of monomer.

P19. An poly(propylene-co-propylene/ethylene) impact copolymer made by the process of any one of the previous numbered paragraphs.

P20. A poly(propylene-co-propylene/ethylene) impact copolymer comprising (or consisting essentially of) a propylene homopolymer and within the range from 8 or 10 wt % to 22 or 26 or 30 wt % of a propylene/ethylene copolymer comprising within a range from 35 or 40 wt % to 55 or 60 wt % ethylene derived monomer units, and having a melt flow rate (ASTM D1238 230° C./2.16 kg) within a range from 0.0050 g/10 min to 5.0 g/10 min; wherein the melt flow rate of the poly(propylene-co-propylene/ethylene) impact copolymer is within a range from 20 or 25 g/10 min to 35 or 40 or 45 or 50 or 55 or 60 or 70 or 80 or 100 g/10 min; and wherein the melt flow rate of the propylene homopolymer is within a range from 80 or 100 g/10 min to 220 or 260 or 280 or 300 or 400 or 500 g/10 min.

P20. The use of a titanocene catalyst in a feed line to a polymerization reactor to regulate and/or remove hydrogen from the feed supplied to the polymerization reactor.

P21. A method of regulating hydrogen in a polymerization reactor comprising (or consisting essentially of, or consisting of) providing a first reactor (preferably a slurry polymerization reactor) and a second reactor (preferably a gas phase reactor) fluidly connected and arranged in series; contacting α-olefin monomers and a polymerization catalyst in the first reactor to form a first polyolefin; contacting a first feed comprising hydrogen, the polymerization catalyst, and the first polyolefin with a hydrogenation catalyst to form a second feed; contacting the second feed with α-olefin monomers and the same or different polymerization catalyst in the second reactor to form a polyolefin impact copolymer; wherein the amount of hydrogen in the first feed is greater than that in the second feed.

As used in a process claim, the term In any embodiment, the phrase "consisting essentially of" means that no low pressure separation system is present; and more preferably means that no other chemical transformative steps are present in the claimed invention in addition to the absence of a low pressure separation system, but does allow for physical transformations of temperature change, pressure change, concentration change, etc.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A method of regulating hydrogen in a polymerization reactor comprising:
    providing a first reactor and a second reactor fluidly connected and arranged in series;
    contacting α-olefin monomers and a polymerization catalyst in the first reactor to form a first polyolefin;
    contacting a first feed comprising hydrogen, the polymerization catalyst, and the first polyolefin with a hydrogenation catalyst to form a second feed;
    contacting the second feed with α-olefin monomers and the same or different polymerization catalyst in the second reactor to form a polyolefin impact copolymer;
    wherein the second reactor is a gas phase reactor comprising an expansion zone, a fluidized bed zone, and a feed line fluidly connected to the gas phase reactor, wherein contacting the first feed with the hydrogenation catalyst takes place within the feed line;
    wherein the amount of hydrogen in the first feed is greater than that in the second feed.

2. The method of claim 1, wherein the α-olefin monomers comprise propylene, the first reactor comprises a slurry loop reactor, and the second reactor comprises a gas phase reactor.

3. The method of claim 1, wherein the first feed is contacted with the hydrogenation catalyst in a feed line connected to the first reactor.

4. The method of claim 1, wherein the first feed is contacted with the hydrogenation catalyst in a recycle line connected to the first reactor.

5. The method of claim 1, wherein the hydrogenation catalyst comprises a titanocene catalyst precursor.

6. The method of claim 5, wherein the hydrogenation catalyst further comprises an alkylaluminum.

7. The method of claim 5, comprising feeding the titanocene catalyst precursor within the range from 500 to 5,000 mol $H_2$/mole titanium/minute.

8. The method of claim 6, wherein a molar ratio of alkylaluminum to titanocene is from 1 to 5.

9. The method of claim 6, wherein the alkylaluminum is a C1 to C5 alkylaluminum.

10. The method of claim 1, wherein the first feed comprises within the range from 100 mppm to 15,000 mppm of hydrogen relative to the total amount of monomer.

11. The method of claim 1, wherein the second feed comprises within the range from 0 mppm to 10,000 mppm of hydrogen relative to the total amount of monomer.

12. The method of claim 1, wherein the first feed further comprises propylene homopolymer.

13. The method of claim 12, wherein the α-olefin monomers are ethylene and propylene, and the polymerization catalyst is contacted with the propylene homopolymer and α-olefin monomers to form a poly(propylene-co-propylene/ethylene) impact copolymer comprising a propylene/ethylene copolymer.

14. The method of claim 13, wherein the melt flow rate (ASTM D1238 230° C./2.16 kg) of the propylene/ethylene copolymer is within a range from 0.0050 g/10 min to 100 g/10 min.

15. The method of claim 13, wherein the propylene/ethylene copolymer comprises within a range from 35 wt % to 60 wt % ethylene derived monomer units.

16. The method of claim 1, wherein the hydrogen content in the first feed is greater than the hydrogen content in the second feed.

17. A method of reducing hydrogen in a polymerization reaction comprising:
    contacting a first feed comprising hydrogen with a hydrogenation catalyst prior to entering a polymerization reactor to form a second feed;
    contacting the second feed with α-olefin monomers and a polymerization catalyst in the polymerization reactor to form a polyolefin;
    wherein the amount of hydrogen in the first feed is greater than that in the second feed.

18. The method of claim 17, wherein the second reactor is a gas phase reactor comprising an expansion zone, a fluidized bed zone, and a feed line fluidly connected to the gas phase reactor, wherein contacting the first feed with the hydrogenation catalyst takes place the feed line.

19. The method of claim 17, wherein the first feed further comprises propylene homopolymer.

20. The method of claim 18, wherein the polymerization catalyst is contacted with the propylene homopolymer and ethylene to form a poly(propylene-co-propylene/ethylene) impact copolymer comprising a propylene/ethylene copolymer.

21. The method of claim 1, wherein the propylene/ethylene copolymer comprises within a range from 35 wt % to 60 wt % ethylene derived units.

22. The method of claim 17, wherein the hydrogenation catalyst comprises a titanocene catalyst precursor and an alkylaluminum.

23. The method of claim 17, wherein a low pressure separation system is absent from the feed line or polymerization reactor.

24. The method of claim 17, wherein the first feed comprises within the range from 100 mppm to 15,000 mppm of hydrogen relative to the total amount of monomers, and the second feed comprises within the range from 0 mppm to 10,000 mppm of hydrogen relative to the total amount of monomer.

25. A method of regulating hydrogen in a polymerization reactor comprising:
    providing a first reactor and a second reactor fluidly connected and arranged in series;
    contacting α-olefin monomers and a polymerization catalyst in the first reactor to form a first polyolefin;
    contacting a first feed comprising hydrogen, the polymerization catalyst, and the first polyolefin with a hydrogenation catalyst to form a second feed;
    wherein the hydrogenation catalyst comprises a titanocene catalyst precursor and an alkylaluminum at a molar ratio of alkylaluminum to titanocene of from 1 to 5;
    contacting the second feed with α-olefin monomers and the same or different polymerization catalyst in the second reactor to form a polyolefin impact copolymer;

wherein the amount of hydrogen in the first feed is greater than that in the second feed.

26. The method of claim 25, wherein the first feed further comprises propylene homopolymer.

27. The method of claim 25, wherein the α-olefin monomers are ethylene and propylene, and the polymerization catalyst is contacted with the propylene homopolymer and α-olefin monomers to form a poly(propylene-co-propylene/ethylene) impact copolymer comprising a propylene/ethylene copolymer.

28. The method of claim 25, wherein the second reactor is a gas phase reactor comprising an expansion zone, a fluidized bed zone, and a feed line fluidly connected to the gas phase reactor, wherein contacting the first feed with the hydrogenation catalyst takes place within the feed line.

* * * * *